(12) United States Patent
Salsich

(10) Patent No.: US 9,156,103 B2
(45) Date of Patent: Oct. 13, 2015

(54) MODULAR DIRECT CURRENT POWER SOURCE

(75) Inventor: Anthony Van Bergen Salsich, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 918 days.

(21) Appl. No.: 13/117,018

(22) Filed: May 26, 2011

(65) Prior Publication Data

US 2011/0309054 A1 Dec. 22, 2011

Related U.S. Application Data

(60) Provisional application No. 61/355,983, filed on Jun. 17, 2010.

(51) Int. Cl.
 B23K 11/04 (2006.01)
 B23K 9/10 (2006.01)
 B23K 9/09 (2006.01)

(52) U.S. Cl.
 CPC ............... *B23K 9/1043* (2013.01); *B23K 9/09* (2013.01)

(58) Field of Classification Search
 CPC .. B23K 9/1006; B23K 9/1012; B23K 9/1075; B23K 9/1043

USPC ............... 219/130.1, 130.21, 130.31, 130.32, 219/130.33, 137 PS
 See application file for complete search history.

(56) References Cited

U.S. PATENT DOCUMENTS

| 6,023,037 | A  | * | 2/2000 | Church et al. ........... 219/121.39 |
| 7,782,032 | B2 | * | 8/2010 | Taufik et al. ................... 323/272 |
| 2003/0164645 | A1 | | 9/2003 | Crandell, III |
| 2006/0213891 | A1 | * | 9/2006 | Stava ........................ 219/130.21 |
| 2006/0226130 | A1 | * | 10/2006 | Kooken et al. ............. 219/130.1 |
| 2011/0011842 | A1 | * | 1/2011 | Thomas ................... 219/130.21 |

FOREIGN PATENT DOCUMENTS

| CN | 1695866 | 11/2005 |
| EP | 1710897 A2 | 10/2006 |
| JP | 2001129667 | 5/2001 |
| TW | 503149 | 9/2002 |

OTHER PUBLICATIONS

Interantional Search Report for application No. PCT/US2011/040400 mailed Oct. 5, 2011.

* cited by examiner

*Primary Examiner* — Dana Ross
*Assistant Examiner* — Joseph Iskra
(74) *Attorney, Agent, or Firm* — Fletcher Yoder P.C.

(57) ABSTRACT

A modular direct current power source is provided. One welding power supply system includes a plurality of hysteretic buck converters coupled in parallel. The hysteretic buck converters are configured to receive a common input and to provide combined output power to a common load based upon the common input.

20 Claims, 9 Drawing Sheets

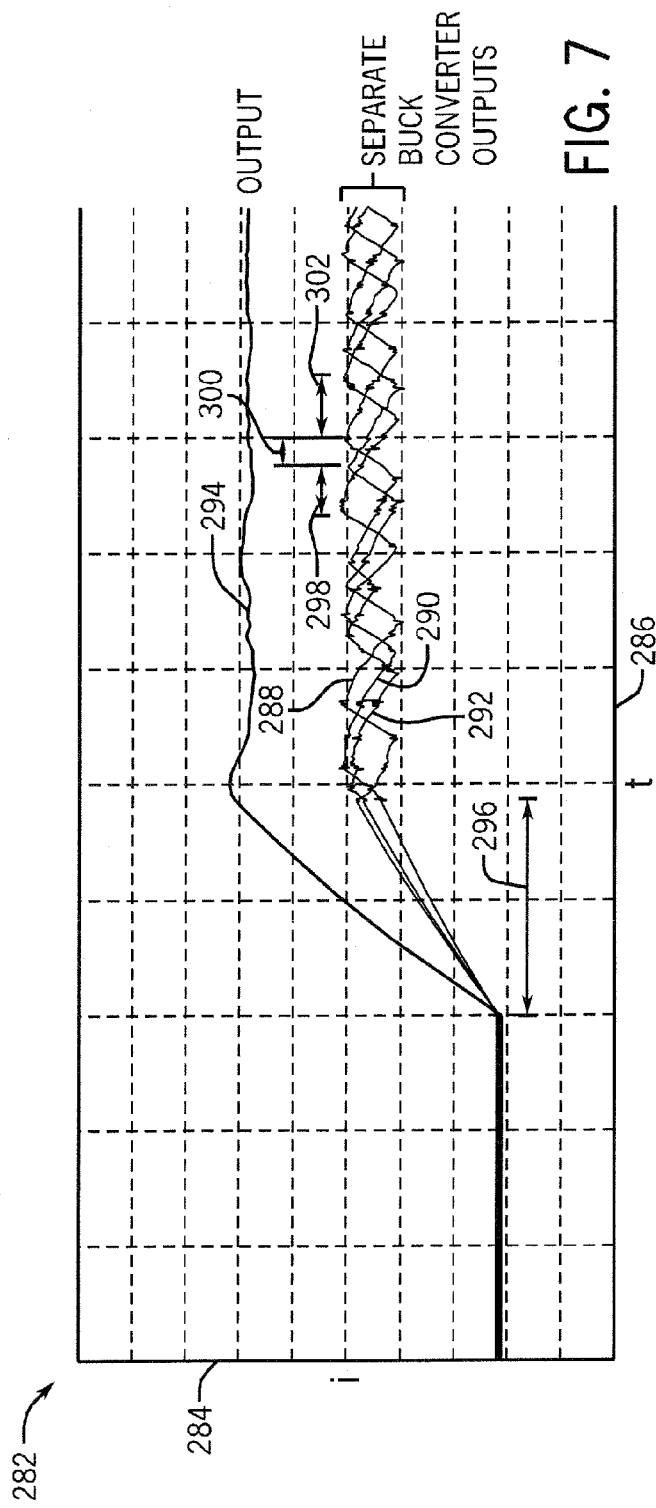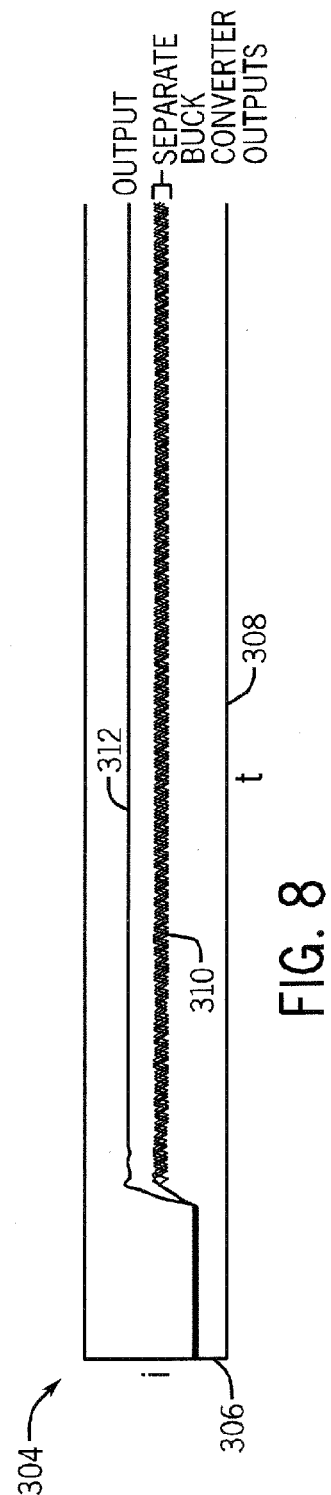

MODULAR DIRECT CURRENT POWER SOURCE

CROSS REFERENCE TO RELATED APPLICATIONS

This application is a Non-Provisional patent application of U.S. Provisional Patent Application No. 61/355,983 entitled "Multi-phase Power Modulator Utilizing Hysteretic Control for a Welder Induction Heater, or Plasma Cutter", filed Jun. 17, 2010, which is herein incorporated by reference.

BACKGROUND

The invention relates generally to welding systems and, more particularly, to a modular power source that may be used for welding applications.

Welding is a process that has become increasingly ubiquitous in various industries and applications. Such processes may be automated in certain contexts, although a large number of applications continue to exist for manual welding operations. In both cases, such welding operations rely on a variety of types of equipment to ensure that the supply of welding consumables (e.g., wire feed, shielding gas, etc.) and welding power are provided to the weld in an appropriate amount at the desired time. For example, metal inert gas (MIG) welding processes such as regulated metal deposition (RMD™) and pulse utilize a modulator to provide power quickly in response to requested power.

In MIG welding applications long welding cables may be used. Unfortunately, lengthy cables introduce significant inductance between a welding power source and a welding application. Thus, in such conditions, an additional power converter may be used near the welding application to limit the effect of the inductance in the cables. Such converters often use a pulse-width modulation (PWM) control method with a limited bandwidth and require special control circuitry. Therefore, there is a need in the field for techniques that might provide alternatives to PWM control-based power converters.

BRIEF DESCRIPTION

In one embodiment, a welding power supply system includes a plurality of modular hysteretic buck converters coupled in parallel. The hysteretic buck converters are configured to receive a common input and to provide combined output power to a common load based upon the common input.

In another embodiment, a welding system includes a welding power supply configured to provide a direct current power. The welding system also includes a power converter having a plurality of hysteretic buck converters coupled in parallel. The plurality of hysteretic buck converters are configured to receive a common input and to provide combined output power to a common load based upon the common input. The power converter is configured to receive the direct current power from the welding power supply.

In another embodiment, a power supply system includes a plurality of hysteretic buck converters coupled in parallel and configured to receive a common input. The plurality of hysteretic buck converters is also configured to provide combined output power to a common load based upon the common input. The welding power supply system also includes a boost converter coupled to the buck converters and configured to provide power to the common input of the buck converters.

DRAWINGS

These and other features, aspects, and advantages of the present invention will become better understood when the following detailed description is read with reference to the accompanying drawings in which like characters represent like parts throughout the drawings, wherein:

FIG. 7 is an exemplary graph of output current of hysteretic buck converters versus time;

FIG. 8 is another exemplary graph of output current of hysteretic buck converters versus time.

DETAILED DESCRIPTION

Figure 1:
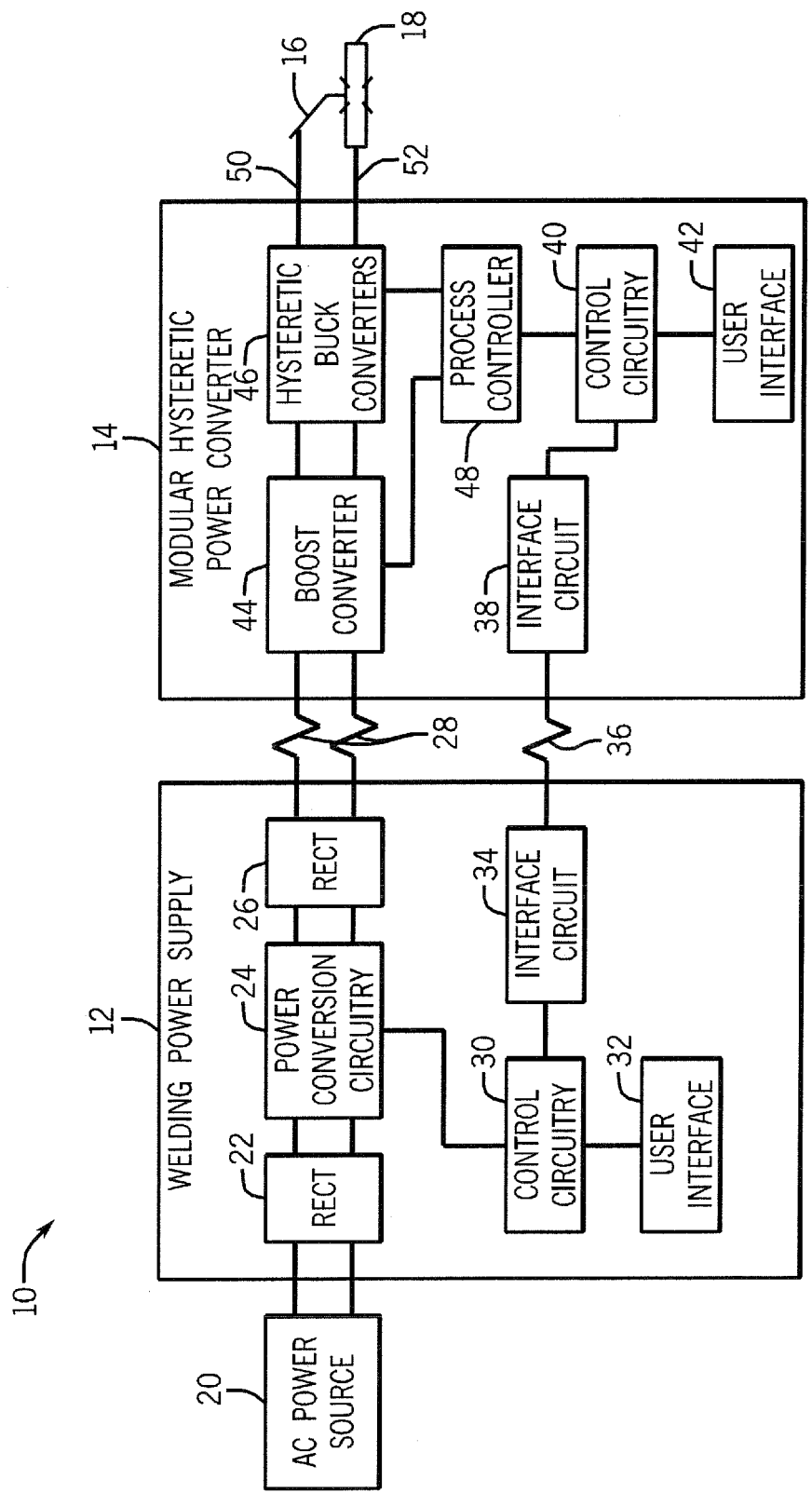
FIG. 1 is a schematic diagram of an embodiment of a welding system employing a modular hysteretic power converter.

FIG. 1 is a schematic diagram of an embodiment of a welding system 10 which powers, controls, and provides supplies to a welding operation. As illustrated, the welding system 10 includes a welding power supply 12, a modular hysteretic power converter 14, a torch 16, and a workpiece 18. The welding power supply 12 receives primary power from an alternating current power source 20 (e.g., the AC power grid, an engine/generator set, or a combination thereof), conditions the input power, and provides an output power to one or more welding devices in accordance with demands of the system 10. The welding power source 12 includes a first rectifier 22, power conversion circuitry 24, and a second rectifier 26. The first rectifier 22 converts the alternating current (AC) from the power source 20 to a direct current (DC) and provides the DC to the power conversion circuitry 24. The power conversion circuitry 24 converts the DC power to voltages that may be used by other components of the welding power supply 12. Furthermore, the power conversion circuitry 24 converts the DC back to AC to allow additional control of the output to other welding devices. Thereafter, the second rectifier 26 converts the AC back to DC and supplies the DC to the modular hysteretic power converter 14 via cable 28.

The power conversion circuitry 24 may include circuit elements such as transformers, switches, boost converters, inverters, and so forth, capable of converting power as dictated by the demands of the system 10. Such circuits are generally known in the art. In some embodiments, the power conversion circuitry 24 may be configured to convert the primary power to both weld and auxiliary power outputs. However, in other embodiments, the power conversion circuitry 24 may be adapted to convert primary power only to a weld power output, and a separate auxiliary converter may be provided to convert primary power to auxiliary power. Still further, in some embodiments, the welding power supply 12 may be adapted to receive a converted auxiliary power output directly from a wall outlet. Indeed, any suitable power conversion system or mechanism may be employed by the welding power supply 12 to generate and supply both weld and auxiliary power.

The welding power supply 12 includes control circuitry 30 and a user interface 32. The control circuitry 30 controls the operations of the welding power supply 12 and may receive input from the user interface 32 through which a user may choose a process, and input desired parameters (e.g., voltages, currents, particular pulsed or non-pulsed welding regimes, and so forth). The control circuitry 30 may be configured to receive and process a plurality of inputs regarding the performance and demands of the system 10. Furthermore, the control circuitry 30 controls parameters input by the user as well as any other parameters. The control circuitry 30 may include volatile or non-volatile memory, such as ROM, RAM, magnetic storage memory, optical storage memory, or a combination thereof. In addition, a variety of control parameters may be stored in the memory along with code configured to provide a specific output (e.g., initiate wire feed, enable gas flow, etc.) during operation.

Data is communicated between the control circuitry 30 and an interface circuit 34. The interface circuit 34 conditions the data from the control circuitry 30 for communication via a cable 36 to other welding devices, such as the modular hysteretic power converter 14 or a wire feeder. An interface circuit 38 in the modular hysteretic power converter 14 receives data from the welding power supply 12 and conditions the data for communication with control circuitry 40. The control circuitry 40 functions similar to control circuitry 30, but controls the functionality of the modular hysteretic power converter 14. The control circuitry 40 may receive input from a user interface 42 through which a user may input desired parameters (e.g., voltages, currents, and so forth). Furthermore, the user interface 42 may include a display to display information to an operator, such as whether portions of the modular hysteretic power converter 14 are fully operational.

The cable 28 provides DC power from the welding power supply 12 to the modular hysteretic power converter 14. As may be appreciated, cable 28 may be extremely long, such as approximately 150 to 200 feet long, resulting in a significant amount of inductance between the welding power supply 12 and the modular hysteretic power converter 14. Therefore, the modular hysteretic power converter 14 is used to overcome effects caused by the inductance, such as for RMD™ and pulse welding processes. The modular hysteretic power converter 14 includes a boost converter 44, modular hysteretic buck converters 46, and a process controller 48. The boost converter 44 receives DC voltage from cable 28 and steps-up, or increases, the DC voltage to provide power to a common input of the hysteretic buck converters 46. By using the boost converter 44, the current ripple of the output from the boost converter 44 may be decreased, such as by using various control means. Specifically, in certain embodiments, the current ripple of a bus capacitor at the output from the boost converter 44 may be decreased using various control means.

The hysteretic buck converters 46 receive the stepped-up DC voltage and step-down, or decrease, the DC voltage to control the flow of weld current. In certain embodiments, the hysteretic buck converters 46 may provide a greater amount of current than is possible by using the DC input to the modular hysteretic power converter 14 without the converters 46 to manage transient load currents, such as with RMD™ and pulse welding processes. The hysteretic buck converters 46 include at least two hysteretic buck converters coupled in parallel and configured to receive a common input and to provide combined output power to a common load (e.g., welding torch) based upon the common input. In certain embodiments, the hysteretic buck converters 46 may include any number of hysteretic buck converters. The process controller 48 controls the operation of the boost converter 44 and the hysteretic buck converters 46 by providing reference signals and other signals to the converters 44 and 46. Welding power is output from the hysteretic buck converters 46 and flows through welding cables 50 and 52 and may be used for various welding processes, such as regulated metal deposition and pulse welding processes. Specifically, when a welding arc is formed, welding power flows through cable 50 to the welding torch 16, through the arc, and through the workpiece 18 and cable 52.

As may be appreciated, the modular hysteretic power converter 14 may be used in a variety of applications outside the field of welding, such as in power supplies or power supply systems. In such embodiments, the modular hysteretic power converter 14 may be modified, such as by increasing or decreasing the number of hysteretic buck converters, to alter the combined output to a particular desired output level. Furthermore, the modular hysteretic power converter 14 may facilitate other service, replacement, and/or manufacturing processes. In certain embodiments, the circuitry of the welding system 10 may include similar components to other welding systems with the exception that the other welding system may include pulse-width modulated (PWM) circuitry and related switching circuitry. Such other welding systems may be modified to function more like the welding system 10 by removing PWM circuitry and the related switching circuitry and replacing such circuitry with the modular hysteretic power converter 14.

Figure 2:
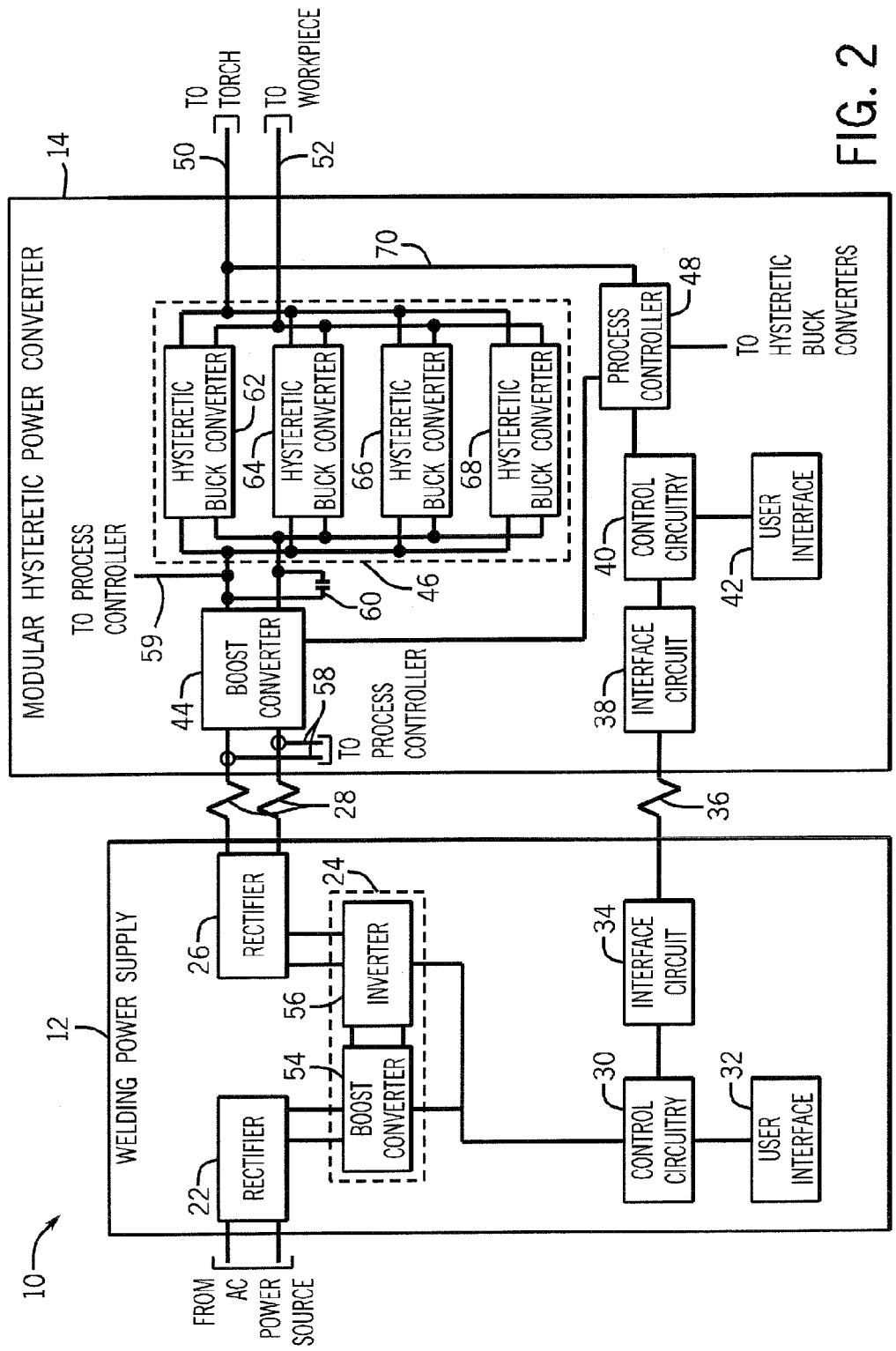
FIG. 2 is a schematic diagram of another embodiment of a welding system employing a modular hysteretic power converter.

FIG. 2 is a schematic diagram of another embodiment of a welding system 10 employing a modular hysteretic power converter 14. As illustrated, the power conversion circuitry 24 includes a boost converter 54 to step-up, or increase, the DC voltage received from the first rectifier 22 and an inverter 56 to output AC to the second rectifier 26. DC power flows from the welding power supply 12 to the modular hysteretic power converter 14 via the cable 28. The process controller 48 of the modular hysteretic power converter 14 uses monitors 58 to monitor the voltage and current at the input to the modular hysteretic power converter 14. Furthermore, the process controller 48 uses monitor 59 to monitor the common input voltage to the hysteretic buck converters 46. As previously described, the boost converter 44 receives DC voltage from cable 28 and steps-up the DC voltage to provide power to the common input of the hysteretic buck converters 46. A capacitor 60 is coupled across the DC power signals between the boost converter 44 and the hysteretic buck converters 46. The capacitor 60 helps to smooth output from the boost converter 44 which is provided to the hysteretic buck converters 46.

In the illustrated embodiment, the power converter circuitry includes four hysteretic buck converter circuits 62, 64, 66, and 68. As previously described, the hysteretic buck converters 46 may include any number of buck converters. Each hysteretic buck converter circuit 62, 64, 66, and 68 has a common input from the boost converter 44 and a common output to cables 50 and 52 which provide power to the torch. However, the hysteretic buck converter circuits 62, 64, 66, and 68 operate independently from each other. A voltage and current monitor 70 is attached to the output of the hysteretic buck converters 46 to monitor the output voltage and current of the modular hysteretic power converter 14. The process controller 48 uses the input current measured from monitor 58, the input bus voltage of the hysteretic buck converters 46 measured from monitor 59, and the output voltage and current measured from the monitor 70 to control the boost converter 44 and the hysteretic buck converters 46. Specifically, in certain embodiments, the boost converter 44 is controlled to have its input current track the output current scaled by the ratio of output voltage and input bus voltage of the hysteretic buck converters 46.

Figure 3:
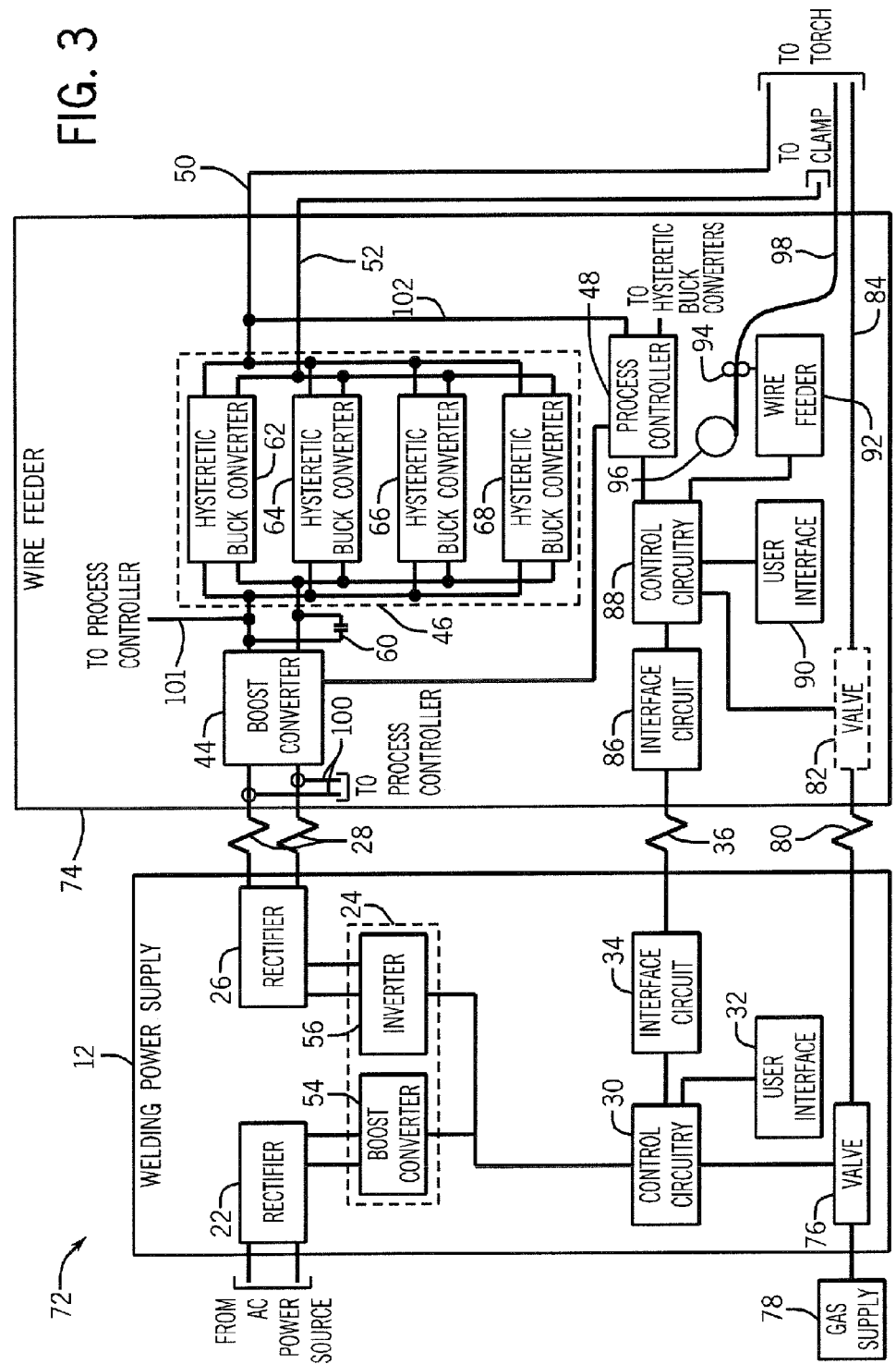
FIG. 3 is a schematic diagram of an embodiment of a welding system with a wire feeder employing a modular hysteretic power converter.

FIG. 3 is a schematic diagram of an embodiment of a welding system 72 with a wire feeder 74. The wire feeder 74 includes the functionality of the modular hysteretic power converter 14 described in FIG. 2. The welding power supply 12 includes a valve 76 to modulate the amount of gas supplied to a welding operation. The valve 76 operates with signals from the control circuitry 30. A gas supply 78 may provide shielding gases, such as argon, helium, carbon dioxide, and so forth. The gas enters valve 76 then exits the valve and flows through cable 80. As illustrated, the cable 80 supplies the wire feeder 14 and/or torch with shielding gas. The wire feeder 14 may also include a valve 82 to modulate the amount of gas supplied to a welding operation. Shielding gas flows from the valve 82 to a cable 84 that provides shielding gas to the welding torch.

An interface circuit 86 in the wire feeder 74 receives data from the welding power supply 12 and conditions the data for communication with control circuitry 88. The control circuitry 88 functions similar to control circuitry 30, but controls the functionality of the wire feeder 74. The control circuitry 88 may receive input from a user interface 90 through which a user may input desired parameters (e.g., voltages, currents, and so forth). Furthermore, the user interface 90 may include a display to display information to an operator, such as whether portions of the wire feeder 74 are fully operational. The control circuitry 88 also provides signals to control a wire drive 92. The wire drive 92 rotates rollers 94 which feed wire from a spool 96. Wire is fed through the rollers 94 to provide wire 98 to the torch for a welding operation.

The wire feeder 74 includes the boost converter 44, the hysteretic buck converters 46, and the process controller 48. DC power flows from the welding power supply 12 to the wire feeder 74 via the cable 28. The process controller 48 of the wire feeder 74 uses monitors 100 to monitor the voltage and current at the input to the wire feeder 74. Furthermore, the process controller 48 uses monitor 101 to monitor the common input voltage to the hysteretic buck converters 46. Much like the modular hysteretic power converter 14 described in FIG. 2, the boost converter 44 receives DC voltage from cable 28 and steps-up the DC voltage to provide power to the common input of the hysteretic buck converters 46. Furthermore, the capacitor 60 is coupled across the DC power signals between the boost converter 44 and the hysteretic buck converters 46. A voltage and current monitor 102 are attached to the output of the hysteretic buck converters 46 to monitor the output voltage and current of the wire feeder 74. The process controller 48 uses the input current measured from monitor 100, the input bus voltage of the hysteretic buck converters 46 measured from monitor 101, and the output voltage and current measured from the monitor 102 to control the boost converter 44 and the hysteretic buck converters 46. Specifically, in certain embodiments, the boost converter 44 is controlled to have its input current track the output current scaled by the ratio of output voltage and input bus voltage of the hysteretic buck converters 46.

Figure 4:
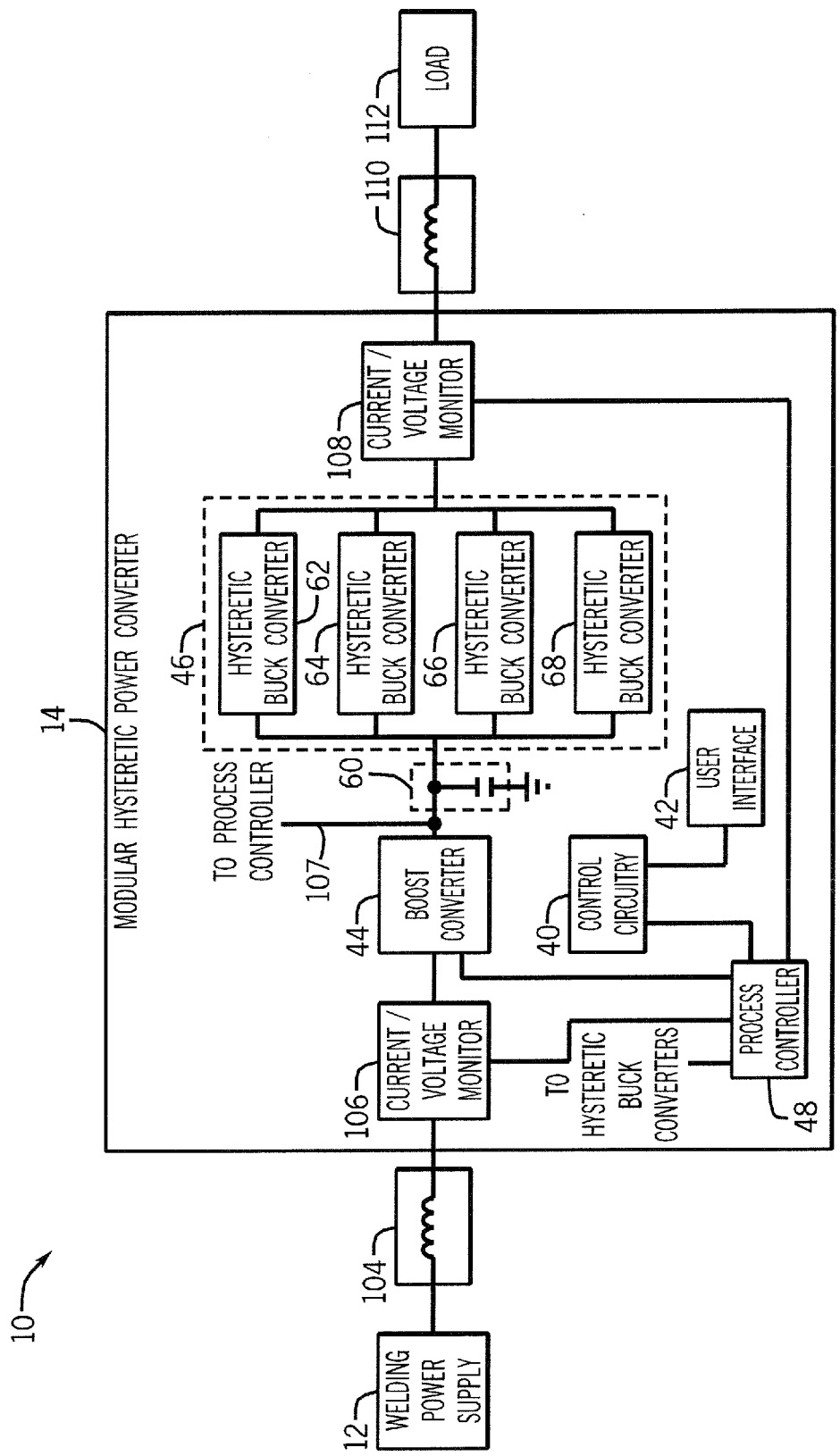
FIG. 4 is a schematic diagram of an embodiment of a modular hysteretic power converter of FIG. 2.

FIG. 4 is a schematic diagram of an embodiment of the modular hysteretic power converter 14 of FIG. 2. As illustrated, a cable 104 is coupled between the welding power supply 12 and the modular hysteretic power converter 14. The cable 104 has an inductance based on the length of the cable 104, the geometry, the routing, and/or the composition of the cable 104 (e.g., coiled, laying on ferrous metals, tightly paired electrode-work cables, etc.). For example, as the cable 104 is longer, the inductance increases, and as the cable 104 is shorter, the inductance decreases. DC power is provided from the welding power supply 12 to the modular hysteretic power converter 14 through the cable 104. A voltage and current monitor 106 monitors the input voltage and current to the modular hysteretic power converter 14 and provides measurements to the process controller 48. The input power is converted by the boost converter 44 and the hysteretic buck converters 46 to provide output power. Furthermore, the process controller 48 uses monitor 107 to monitor the common input voltage to the hysteretic buck converters 46. The voltage and current of the output power is monitored by monitor 108. Again, the voltage and current measurement are provided to the process controller 48. The output power flows through a cable 110 and is provided to a load 112, such as a welding torch. Like cable 104, cable 110 also has an inductance based on the length of the cable 110, the geometry, the routing, and/or the composition of the cable 110. As may be appreciated, the inductance of cable 104 provides some of the inductance utilized by the boost converter 44, while an output inductor of the welding power supply 12 provides additional inductance. Furthermore, the impedance, which includes resistance and inductance of cable 110, causes the output of the hysteretic buck converters 46 to adjust their phases relative to each other. For example, each of the individual hysteretic buck converter circuits 62, 64, 66, and 68 use the cable 110, so the impedance of the cable 110 is common to these circuits. Therefore, the common impedance of the cable 110 alters the current slopes of the hysteretic buck converter circuits 62, 64, 66, and 68 and causes the output from each of the hysteretic buck converter circuits 62, 64, 66, and 68 to influence the output of each of the other hysteretic buck converter circuits 62, 64, 66, and 68.

Figure 5A:
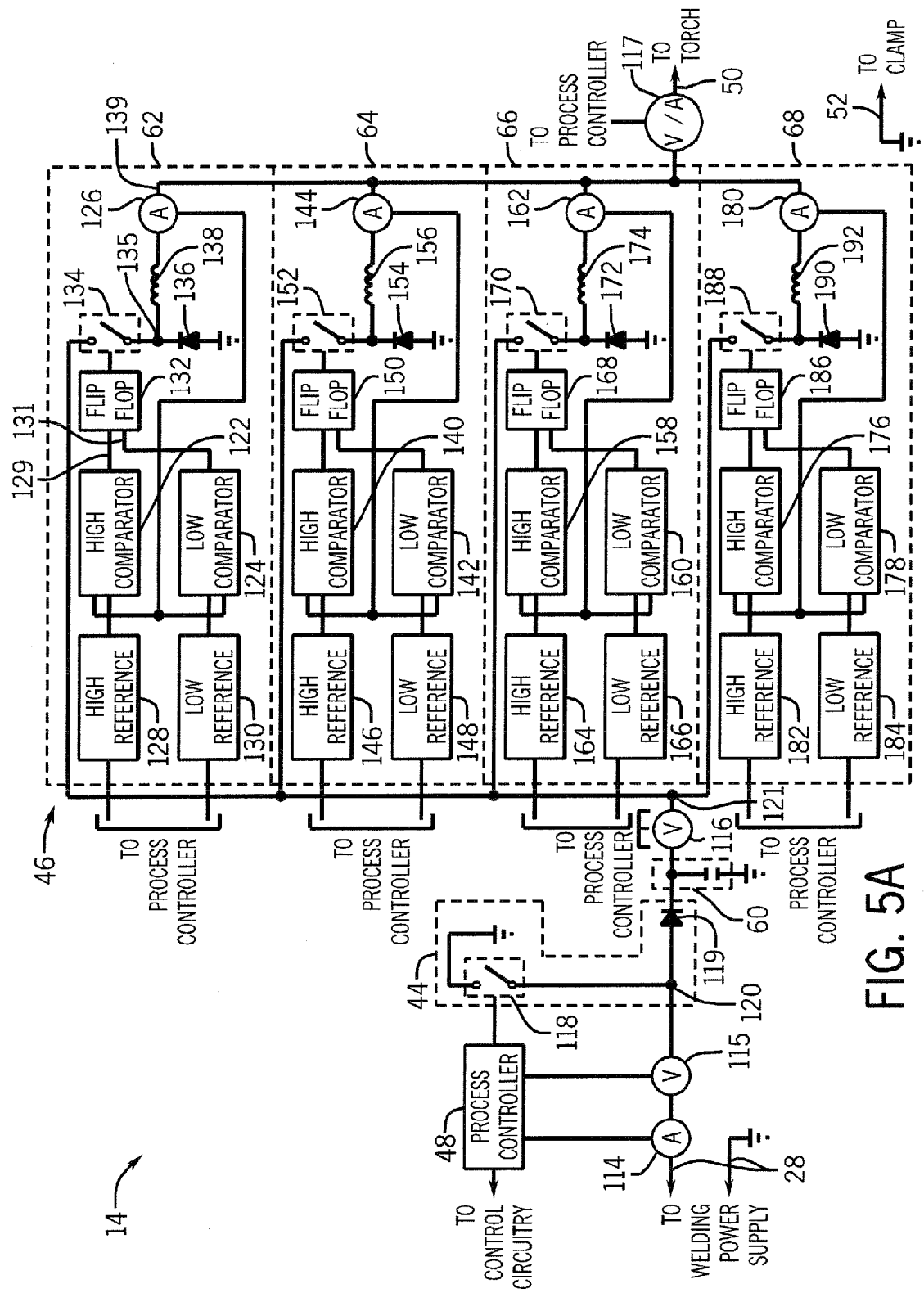
FIG. 5A is a schematic diagram of another embodiment of a modular hysteretic power converter of FIG. 2.

FIG. 5A is a schematic diagram of another embodiment of the modular hysteretic power converter 14 of FIG. 2. As previously described, power flows to the modular hysteretic power converter 14 through the cable 28. Furthermore, a current monitor 114 measures the input current and a voltage monitor 115 measures the input voltages. Both the current monitor 114 and the voltage monitor 115 provide measurements to the process controller 48. Furthermore, the process controller 48 uses monitor 116 to monitor the common input voltage to the hysteretic buck converters 46. The process controller 48 uses these measurements, as well as output voltage and current measurements from a monitor 117 to control the operation of the boost converter 44 and the hysteretic buck converters 46. Specifically, the process controller 48 uses the output current as part of a feed forward loop to control the input current, thereby causing the input current to track the output current scaled by the ratio of output voltage and input bus voltage of the hysteretic buck converters 46.

The boost converter 44 includes a switch 118 and a diode 119. The switch 118 opens or closes a connection between a connection point 120 and circuit common. The switch 118 may be any type of suitable switch, such as relay, FET, or another type of switch. The anode of the diode 119 connects to the connection point 120, while the cathode of the diode 119 connects to a connection point 121. The diode 119 may be any type of suitable diode. In certain embodiments, the diode 119 may be replaced by a switch. Furthermore, the capacitor 60 is coupled between the connection point 121 and circuit common.

As may be appreciated, operation of the boost converter 44 uses the switch 118, the diode 119, the capacitor 60, the inductance from the cable 28, and the inductance of the welding power supply 12. Specifically, the boost converter 44 operates by alternating the switch 118 between the opened and closed position. When the switch 118 is in the open position, as illustrated, current flows through the inductance of cable 28, through diode 119, and to connection point 121. Welding power to the torch is provided from connection point 121 based on the operation of the hysteretic buck converters 46. During this state, the cable 28 inductance provides energy that has been previously stored by the inductance, in addition to the power provided by the welding power supply. Furthermore, the capacitor 60 becomes charged. When the switch 118 transitions to the closed position, current flows through the inductance of cable 28 and through the switch 118 to circuit common. During this state, the energy stored by the inductance of the cable 28 increases. Furthermore, the capacitor 60 discharges to provide power at connection point 121. The diode 119 inhibits the capacitor 60 from discharging through the switch 118.

The hysteretic buck converter circuits 62, 64, 66, and 68 each include similar components, yet operate independently from each other. For example, the hysteretic buck converter circuit 62 includes a high comparator 122 and a low comparator 124. The high and low comparators 122 and 124 may be any type of suitable comparator. The comparators 122 and 124 may each comprise an op-amp, a comparator such as a dedicated voltage comparator, or another type of comparing device. The high comparator 122 compares an output current 126 of the hysteretic buck converter circuit 62 to a high reference 128 to produce a high comparator output 129. The high reference 128 is provided to the high comparator 122 by the process controller 48. During operation, if the output current 126 is greater than the high reference 128, the high comparator output 129 will be in one state (e.g., high, V+, ON, 1, etc.), and if the output current 126 is less than the high reference 128, the high comparator output 129 will be in another state (e.g., low, V−, OFF, 0, etc.). Furthermore, the low comparator 124 compares a low reference 130 to the output current 126 of the hysteretic buck converter circuit 62 to produce a low comparator output 131. The low reference 130 is provided to the low comparator 124 by the process controller 48. During operation, if the output current 126 is greater than the low reference 130, the low comparator output 131 will be in one state (e.g., low, V−, OFF, 0, etc.), and if the output current 126 is less than the low reference 130, the low comparator output 131 will be in another state (e.g., high, V+, ON, 1, etc.).

The high comparator output 129 and the low comparator output 131 are provided as inputs to a flip-flop 132. The flip-flop 132 may be any suitable type of circuit or device that changes between two stable states based on the inputs. The flip-flop 132 determines whether the switch 134 is opened or closed. Like the switch 118, switch 134 may be any type of suitable switch, such as relay, FET, or another type of switch. The switch 134 electrically opens or closes a connection between the connection point 121 and a connection point 135. The hysteretic buck converter 62 also includes a diode 136 and an inductor 138. The anode of the diode 136 connects to circuit common, while the cathode of the diode 136 connects to the connection point 135. Like the diode 119, the diode 136 may be any type of suitable diode. In certain embodiments, the diode 136 may be replaced by a switch. The inductor 138 is coupled between the connection point 135 and a connection point 139. The inductor 138 may be any suitable value.

During operation, the high comparator output 129 and the low comparator output 131 cause the flip-flop 132 to either open or close the switch 134. When the switch 134 is closed, current flows from the connection point 121, through the switch 134, and through the inductor 138. Therefore, the inductor 138 becomes energized and current is provided to the torch through the cable 50. The diode 136 inhibits current flow from connection point 135 to circuit common. When the switch 134 is open, the inductor 138 de-energizes through cable 50, the torch, and the diode 136.

The hysteretic buck converter circuits 64, 66, and 68 are constructed similarly and operate similarly to hysteretic buck converter circuit 62. Specifically, hysteretic buck converter circuit 64 includes a high comparator 140, a low comparator 142, a current monitor 144, a high reference 146, a low reference 148, a flip-flop 150, a switch 152, a diode 154, and an inductor 156. In addition, hysteretic buck converter circuit 66 includes a high comparator 158, a low comparator 160, a current monitor 162, a high reference 164, a low reference 166, a flip-flop 168, a switch 170, a diode 172, and an inductor 174. Furthermore, hysteretic buck converter circuit 68 includes a high comparator 176, a low comparator 178, a current monitor 180, a high reference 182, a low reference 184, a flip-flop 186, a switch 188, a diode 190, and an inductor 192.

As may be appreciated, the hysteretic buck converter circuits 62, 64, 66, and 68 operate without a timing device to each produce an output that is phase shifted relative to one another. The hysteretic buck converter circuits 62, 64, 66, and 68 have output that is phase shifted relative to one another at least partly because of the variance between the inductance of inductors 138, 156, 174, and 192 and partly due to the common output impedance discussed previously. Although the inductors 138, 156, 174, and 192 may be rated at a similar inductance, the tolerance difference between them causes their inductance to vary. Thus, the output current of each hysteretic buck converter circuit 62, 64, 66, and 68 are phase shifted relative to one another.

As illustrated, the modular hysteretic power converter 14 includes current monitors 126, 144, 162, and 180 to monitor each individual hysteretic buck converter. Furthermore, the current monitor 117 monitors the combined current of the hysteretic buck converter circuits 62, 64, 66, and 68. In certain embodiments, the process controller 48 may monitor output current by summing the current of the current monitors 126, 144, 162, and 180, and may not include current monitor 117. As will be shown in the graphs of FIGS. 7 through 9, using the hysteretic buck converters 46, a total output current greater than the total input current may be obtained. Furthermore, current ripple across the capacitor 60 may be reduced by using the boost converter 44. Specifically, the current ripple may be reduced by using the boost converter 44 to control the input current and track the output current. In particular, the process controller 48 uses an output current measurement, such as from current monitor 117, to control the input current to the hysteretic buck converters 46.

As may be appreciated, each voltage level of the high references 128, 146, 164, and 182 may be different from each other, or they may utilize a common reference voltage level. Likewise, each voltage level of the low references 130, 148, 166, and 184 may be different from each other, or they may utilize a common reference voltage level. Furthermore, the voltage level of the high references 128, 146, 164, and 182 may correlate to the voltage level of the low references 130, 148, 166, and 184. For example, the high references 128, 146, 164, and 182 may be a scaled voltage level of the low references 130, 148, 166, and 184, or vice versa. In certain embodiments, the voltage level of the low references 130, 148, 166, and 184 may be multiplied by approximately 2, 4, 8, 10, or any other value to obtain the voltage level of the high references 128, 146, 164, and 182. In addition, the voltage level of the low references 130, 148, 166, and 184 may be a percentage of the voltage level of the high references 128, 146, 164, and 182, or vice versa. For example, the voltage level of the low references 130, 148, 166, and 184 may be approximately 20, 40, 60, or any other percent of the voltage level of the high references 128, 146, 164, and 182.

Figure 5B:
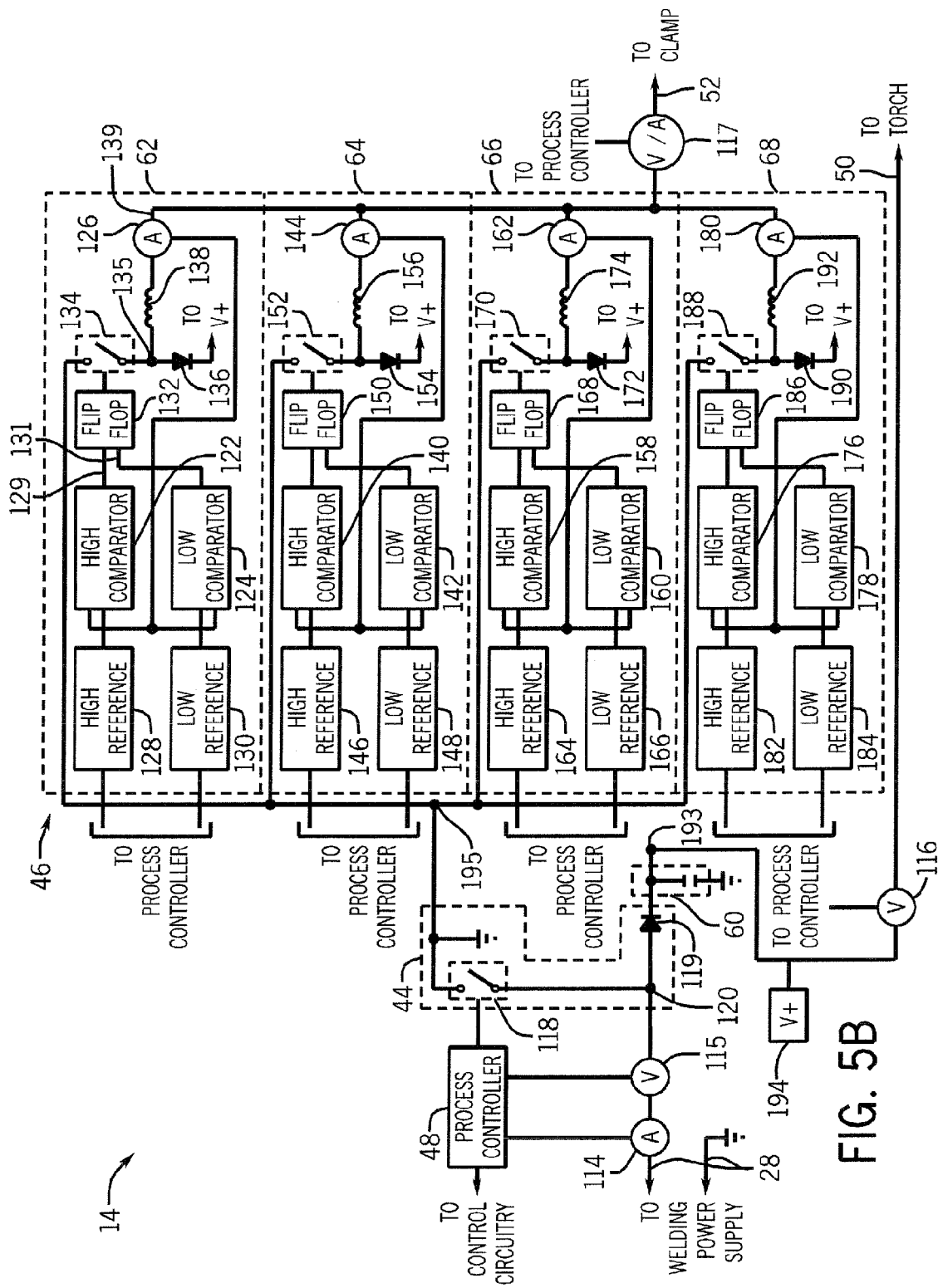
FIG. 5B is a schematic diagram of another embodiment of a modular hysteretic power converter of FIG. 2.

FIG. 5B is a schematic diagram of an embodiment of the modular hysteretic power converter 14 of FIG. 2, with each of the hysteretic buck converter circuits 62, 64, 66, and 68 configured as low side buck converters. This is different from FIG. 5A where each of the hysteretic buck converter circuits 62, 64, 66, and 68 are configured as high side buck converters. As may be appreciated, the modular hysteretic power converter 14 may be configured to use either high or low side buck converters. Furthermore, the modular hysteretic power converter 14 of FIGS. 5A and 5B employ a high side boost converter 44. In certain embodiments, the modular hysteretic power converter 14 may utilize a low side boost converter. In addition, any combination of high or low side boost converters and high or low side buck converters may be incorporated into the modular hysteretic power converter 14.

As illustrated in FIG. 5B, the current flowing from the boost converter 44 flows to a connection point 193 which is connected directly to the torch via cable 50. In addition, the connection point 193 is coupled to a connection point V+ 194 which is coupled to each diode 136, 154, 172, and 190 as depicted in each of the hysteretic buck converter circuits 62, 64, 66, and 68. The anodes of the diodes 136, 154, 172, and 190 are coupled to the switches 134, 152, 170, and 188 and to the inductors 138, 156, 174, and 192. Furthermore, the cathodes of the diodes 136, 154, 172, and 190 are coupled to the connection point V+ 194. In addition, each of the switches 134, 152, 170, and 188 are coupled to a connection point 195 which is coupled to circuit common. The combined output from each of the hysteretic buck converter circuits 62, 64, 66, and 68 is coupled to the work cable 52 which connects to the clamp.

During operation of the hysteretic buck converter circuit 62, the high comparator output 129 and the low comparator output 131 cause the flip-flop 132 to either open or close the switch 134. When the switch 134 is closed, current flows from the work cable 52, through the inductor 138, and through the switch 134 to circuit common. Therefore, the inductor 138 becomes energized and current is provided to the torch through the cable 50. The diode 136 inhibits current flow from the connection point V+ 194 to circuit common. When the switch 134 is open, the inductor 138 de-energizes through the diode 136, through the connection point V+ 194, through cable 50, and through the torch. As may be appreciated, each of the hysteretic buck converter circuits 64, 66, and 68 are constructed similarly and operate similarly to hysteretic buck converter circuit 62.

Figure 6:
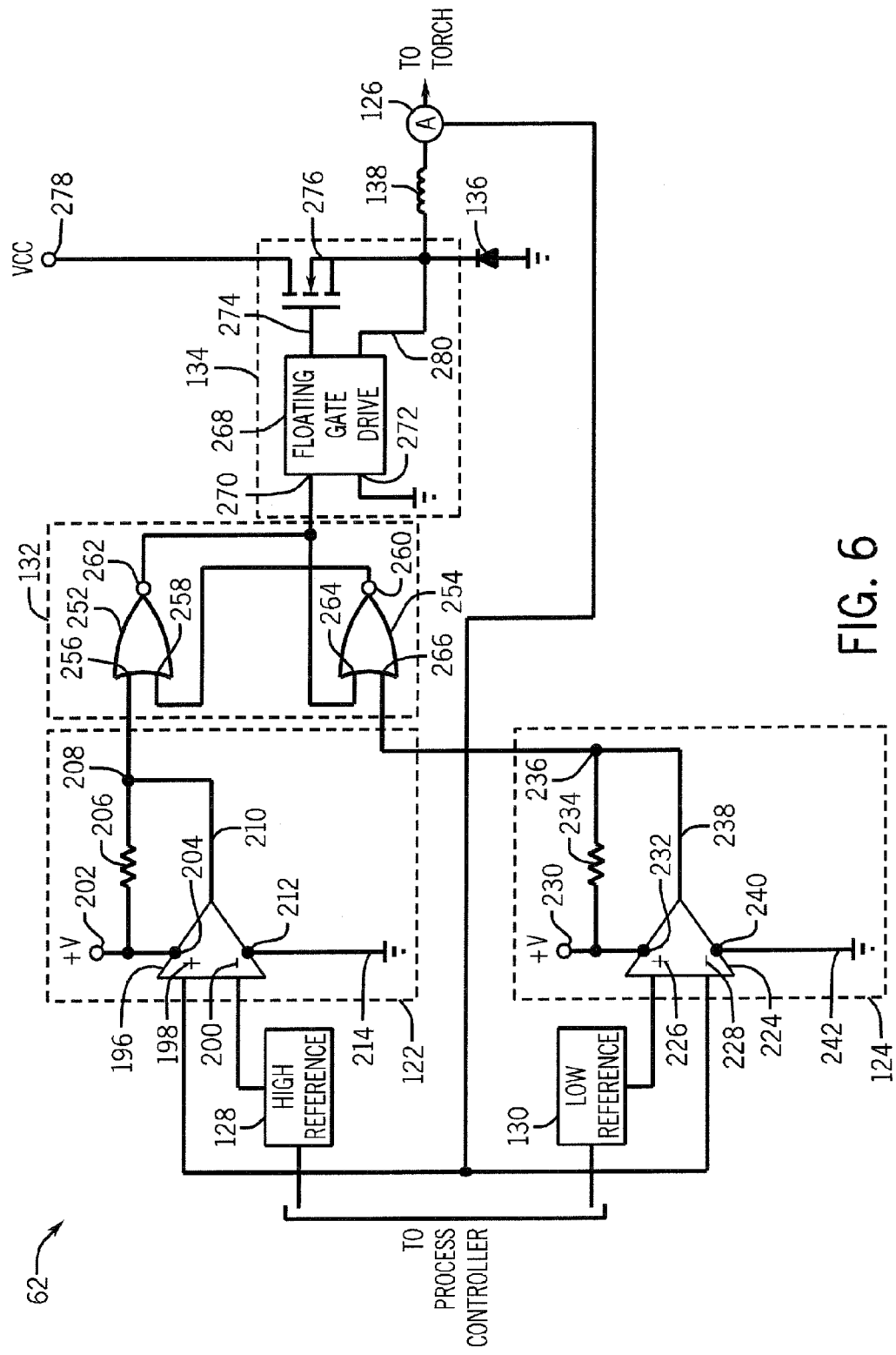
FIG. 6 is a schematic diagram of an embodiment of a hysteretic buck converter of FIG. 5A.

FIG. 6 is a schematic diagram of an embodiment of the hysteretic buck converter circuit 62 of FIG. 5A. Although hysteretic buck converter circuit 62 is illustrated, hysteretic buck converter circuits 64, 66, and 68 may use similar circuitry. The hysteretic buck converter circuit 62 includes the high comparator 122, the low comparator 124, the flip-flop 132, the switch 134, the diode 136, and the inductor 138 as previously described in FIG. 5A. The high comparator 122 includes a comparator 196 which compares two inputs to produce an output to the flip-flop 132. The comparator 196 includes a non-inverting input 198, which receives a signal from the current sensor 126, and an inverting input 200, which receives the high reference 128 provided by the process controller. The comparator 196 is powered by a positive power supply 202 coupled to connection 204. A pull-up resistor 206 is connected to the output 210 of the comparator 196 to enable proper logic voltage levels to be provided to the flip-flop 132. Connection 212 of the comparator 196 is connected to circuit common 214. During operation, if the output current 126 is greater than the high reference 128, the high comparator output 210 will be in one state (e.g., high, V+, ON, 1, etc.), and if the output current 126 is less than the high reference 128, the high comparator output 210 will be in another state (e.g., low, V−, OFF, 0, etc.).

The low comparator 124 includes a comparator 224 which compares two inputs to produce an output to the flip-flop 132 and is configured much like comparator 196. The comparator 224 includes a non-inverting input 226, which receives the low reference 130 provided by the process controller and an inverting input 228, which receives a signal from the current sensor 126. The comparator 224 is powered by a positive power supply 230 coupled to connection 232. A pull-up resistor 234 is connected to the output 238 of the comparator 224 to enable proper logic voltage levels to be provided to the flip-flop 132. Connection 240 of the comparator 224 is connected to circuit common 242. During operation, if the output current 126 is greater than the low reference 130, the low comparator output 238 will be in one state (e.g., low, V−, OFF, 0, etc.), and if the output current 126 is less than the low reference 130, the low comparator output 238 will be in another state (e.g., high, V+, ON, 1, etc.).

The flip-flop 132 may be any suitable type of flip-flop commercially or otherwise available. In certain embodiments, a logic gate, such as a field-programmable gate array (FPGA), a complex programmable logic device (CPLD), etc., may be employed in place of the flip-flop 132. The flip-flop 132 includes a first NOR gate 252 and a second NOR gate 254. The first NOR gate 252 has a first input 256, which is received from the output 210 of the comparator 196, and a second input 258, which is received from an output 260 of the second NOR gate 254. If both the first and second inputs 256 and 258 are a logical low, an output 262 of the NOR gate 252 will be a logical high. Conversely, if one or both of the first and second inputs 256 and 258 are a logical high, the output 262 will be a logical low. The second NOR gate 254 has a first input 264, which is received from the output 262 of the first NOR gate 252, and a second input 266, which is received from the output 238 of the comparator 224. Much like the functionality of the first NOR gate 252, if both the first and second inputs 264 and 266 of the second NOR gate 254 are a logical low, the output 260 will be a logical high. Conversely, if one or both of the first and second inputs 264 and 266 are a logical high, the output 260 will be a logical low.

As a complete unit, the flip-flop 132 functions with two inputs 256 and 266 which come from the outputs 210 and 238 of the comparators 122 and 124. The flip-flop 132 provides a single output 262 to the switch 134. Specifically, during operation, if the output 210 of the high comparator 122 is a logical high (i.e., the output current 126 is higher than the high reference 128), and the output 238 of the low comparator 124 is a logical low (i.e., the output current 126 is higher than the low reference 130), than the output 262 to the floating gate drive 268 will be a logical low. Conversely, if the output 210 of the high comparator 122 is a logical low (i.e., the output current 126 is lower than the high reference 128), and the output 238 of the low comparator 124 is a logical high (i.e., the output current 126 is lower than the low reference 130), than the output 262 to the floating gate drive 268 will be a logical high. On the other hand, if the output 210 of the high comparator 122 is a logical low (i.e., the output current 126 is lower than the high reference 128), and the output 238 of the low comparator 124 is a logical low (i.e., the output current 126 is higher than the low reference 130), than the output 262 to the floating gate drive 268 will remain in its prior logical state. Furthermore, as it may be appreciated, the high reference 128 will be higher than the low reference 130, therefore the outputs 210 and 238 will not both be a logical high at the same time.

The switch 134 includes a floating gate drive 268 which receives the output 262 of the flip-flop 132 at an input 270. The floating gate drive 268 may be any suitable device for activating a switch to enable current flow. Furthermore, the floating gate drive 268 includes a connection 272 to circuit common. When the floating gate drive 268 receives a logical high at the input 270, an output voltage 274 is applied to the gate of a FET 276 to enable current to flow from connection 278, through the FET 276 and the inductor 138, to the welding torch. The FET 276 may be any suitable electronic device that selectively enables current to flow from connection 278 to the welding torch. Power from the boost converter 44 is received at connection 278. The floating gate drive 268 is also connected to the drain of the FET 276 via connection 280.

As a whole unit, the hysteretic buck converter circuit 62 operates by enabling or disabling current flow from connection 278, through the switch 134, through the inductor 138, and to the welding torch. Current flow is enabled at the point when the output current 126 drops below the low reference 130 thereby causing the switch 134 to enable current flow through the FET 276. As the output current 126 increases above the low reference 130, current flow remains enabled until the output current 126 is higher than the high reference 128 because the flip-flop 132 maintains its prior state. When the output current 126 becomes higher than the high reference 128, the flip-flop 132 changes states and current flow through the FET 276 is interrupted. As the output current 126 drops below the high reference 128, current flow remains disabled with the flip-flop 132 maintaining its prior state until the output current 126 again drops below the low reference 130 where the cycle is repeated again. Thus, with such a configuration a hysteretic control of output current is produced.

FIG. 7 is an exemplary graph 282 of an output current 284 of hysteretic buck converters versus time 286. The output current 284 of three separate hysteretic buck converters is illustrated by curves 288, 290, and 292. The curves 288, 290, and 292 fluctuate between a high and low current as the buck converters control their output current to be between high and low references. A curve 294 illustrates the combined output current of the three separate buck converters. This combined output current is provided to the welding torch for welding operations. The curves 288, 290, 292, and 294 each ramp up over an initial time 296. It should be noted that curves 288, 290, and 292 illustrate that the separate buck converters ramp up at different rates. After this time, the current of the separate buck converters fluctuates between the high and low references while the combined output current levels off to provide a fairly steady current flow with minimal ripple.

As depicted, the curves 288, 290, and 292 of the separate buck converters are phase shifted relative to one another. For example, a time 298 represents the time between a peak of curve 290 and an adjacent maxima of curve 288. In addition, a time 300 represents the time between a peak of curve 288 and an adjacent peak of curve 292. Furthermore, a time 302 represents the time between a peak of curve 292 and an adjacent peak of curve 290. The minimum values of curves 288, 290, and 292 are also shifted relative to each other. As such, each of the hysteretic buck converters provide a phase shifted output, thus smoothing the combined current output. As previously described, the hysteretic buck converters are phase shifted at least partly due to the tolerance variance of the inductors used and without the use of any timing device.

FIG. 8 is another exemplary graph 304 of an output current 306 of hysteretic buck converters versus time 308. As depicted by curves 310, after the initial ramp up, the separate buck converter outputs continuously provide a phase shifted output. In addition, curve 312 illustrates how the overall output current ramps up and levels off with minimal ripple.

Figure 9:
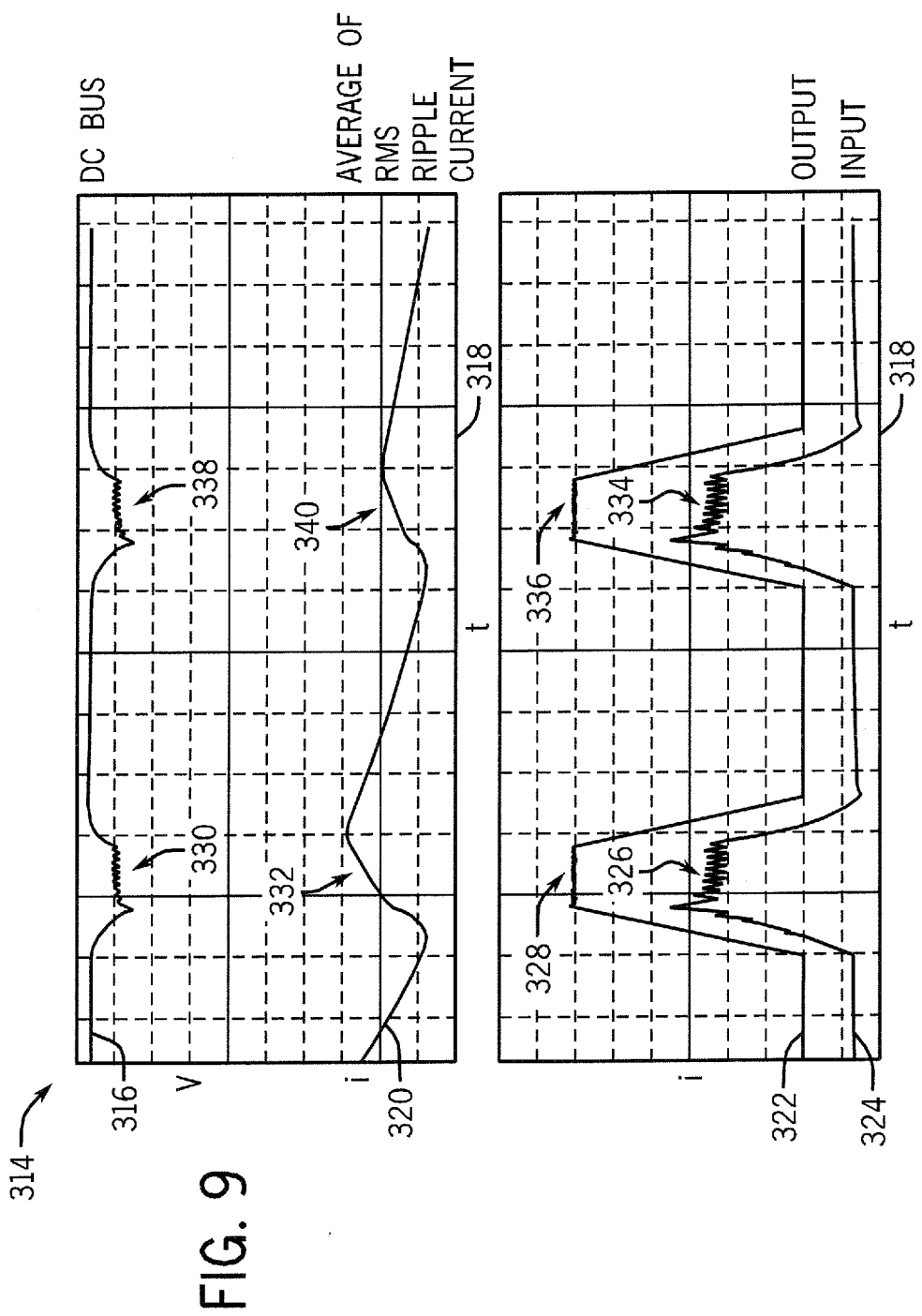
FIG. 9 is an exemplary graph of input current, output current, capacitor current, and bus voltage versus time.

FIG. 9 is an exemplary graph 314 of input current, output current, average of RMS ripple current of the bus capacitor, and bus voltage versus time. Specifically, curve 316 represents a bus voltage at the input to the hysteretic buck converters over time 318, while curve 320 illustrates how the bus capacitor's average RMS ripple current settles over time 318 to a relatively small value. Curve 322 represents total output current from the hysteretic buck converters over time 318 and curve 324 represents input current over time 318. At sections 326 and 328, the input and output current increase, such as while a pulse welding operation is being performed. Curve 322 illustrates a steady increase in current prior to section 328 and a steady decrease afterwards. Curve 324 illustrates how the input current increases to section 326 by following the increase in output current and how the input current decreases from section 326 by following the decrease in output current. Thus, as previously described, the process controller uses the output current as feedback to control the input current. Also, at the time 318 where the output current peaks in section 328, the input DC bus voltage of curve 316 decreases slightly in section 330 of curve 316 as the bus capacitor's average RMS ripple current increases, as illustrated by section 332 of curve 320. A second occurrence of the curve 324 of the input current following the curve 322 of the output current is illustrated via sections 334, 336, 338, and 340.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding power supply system comprising:
a plurality of hysteretic buck converters coupled in parallel and configured to receive a common input and to provide combined output power to a common load based upon the common input, wherein each hysteretic buck converter comprises a high comparator configured to produce a high comparator output and a low comparator configured to produce a low comparator output, and each hysteretic buck converter is configured to provide an output current based at least in part on the respective high comparator output and the respective low comparator output.

2. The system of claim 1, comprising a boost converter coupled to the hysteretic buck converters and configured to provide power to the common input of the hysteretic buck converters.

3. The system of claim 1, wherein each hysteretic buck converter comprises an inductor, and each hysteretic buck converter is configured to automatically phase shift its output current relative to the other hysteretic buck converters without a timing device based at least in part on a variance between the inductors of the plurality of hysteretic buck converters.

4. The system of claim 1, wherein each hysteretic buck converter comprises a flip-flop configured to receive the respective high comparator output and the respective low comparator output, and the flip-flop is configured to control the output current of the respective hysteretic buck converter between a high reference value and a low reference value.

5. The system of claim 1, wherein the hysteretic buck converters are configured to provide power for a regulated metal deposition welding process.

6. The system of claim 1, wherein the hysteretic buck converters are configured to provide power for a pulse welding process.

7. The system of claim 1, wherein the hysteretic buck converters operate independently from each other.

8. The system of claim 1, wherein the hysteretic buck converters comprise a common inductor.

9. The system of claim 1, comprising a process controller coupled to the plurality of hysteretic buck converters and configured to provide reference voltage signals to the respective high comparator and to the respective low comparator of each hysteretic buck converter of the plurality of hysteretic buck converters, wherein the output current of each hysteretic buck converter is based at least in part on the reference voltage signals.

10. The system of claim 1, wherein each hysteretic buck converter comprises a floating gate drive controlled by the hysteretic buck converter.

11. A welding system comprising:
a welding power supply configured to provide a direct current power; and
a power converter comprising a plurality of hysteretic buck converters coupled in parallel and configured to receive a common input and to provide combined output power to a common load based upon the common input, wherein the power converter is configured to receive the direct current power from the welding power supply, each hysteretic buck converter of the plurality of hysteretic buck converters comprises an inductor, and each hysteretic buck converter is configured to automatically phase shift a respective output current relative to the other hysteretic buck converters without a timing device based at least in part on a variance between the inductors of the plurality of hysteretic buck converters.

12. The system of claim 11, comprising a wire feeder having the power converter and configured to provide welding wire.

13. The system of claim 11, wherein the power converter is configured to provide current control based at least partly on the combined output power.

14. The system of claim 11, wherein the power converter comprises a boost converter coupled to the hysteretic buck converters and configured to provide power to the common input of the hysteretic buck converters.

15. The system of claim 11, wherein the hysteretic buck converters operate independently from each other.

16. The system of claim 11, wherein the hysteretic buck converters comprise a common inductor.

17. A power supply system comprising:
a plurality of hysteretic buck converters coupled in parallel and configured to receive a common input and to provide combined output power to a common load based upon the common input, wherein each hysteretic buck converter of the plurality of hysteretic buck converters comprises a switch configured to control an output current of the respective hysteretic buck converter via control of a state of the switch, and the state of the switch of the respective hysteretic buck converter is based at least in part on the output current, a respective high reference, and a respective low reference of the hysteretic buck converter; and
a boost converter coupled to the plurality of hysteretic buck converters and configured to provide power to the common input of the plurality of hysteretic buck converters.

18. The system of claim 17, wherein each hysteretic buck converter is configured to phase shift its output relative to the other hysteretic buck converters without a timing device based at least in part on a variance between inductors of the plurality of hysteretic buck converters.

19. The system of claim 17, comprising a controller configured to provide the respective high reference and the respective low reference to each hysteretic buck converter.

20. The system of claim 17, wherein the plurality of hysteretic buck converters comprise a common inductor.

* * * * *